United States Patent
DiMarzio et al.

(10) Patent No.: US 6,974,606 B2
(45) Date of Patent: Dec. 13, 2005

(54) THERMOPLASTIC COATING FOR COMPOSITE STRUCTURES

(75) Inventors: Don DiMarzio, Northport, NY (US); Charles Weizenecker, Stony Brook, NY (US); Steve Chu, Ronkonkoma, NY (US); Dom Anton, Smithtown, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 421 days.

(21) Appl. No.: 10/444,784

(22) Filed: May 23, 2003

(65) Prior Publication Data

US 2005/0019501 A1 Jan. 27, 2005

(51) Int. Cl.[7] ............................... C23C 4/02; C23C 4/04
(52) U.S. Cl. ...................... 427/447; 427/318; 427/314; 427/407.1; 427/409
(58) Field of Search .................................. 427/447, 314, 427/318, 407.1, 409; 264/402, 403, 404

(56) References Cited

U.S. PATENT DOCUMENTS

| | | | |
|---|---|---|---|
| 3,899,612 A | 8/1975 | Emblem | |
| 4,184,996 A | * 1/1980 | Calundann | 524/605 |
| 4,205,028 A | 5/1980 | Brueggemann et al. | |
| 4,282,642 A | 8/1981 | Rodgers, Jr. | |
| 4,472,451 A | 9/1984 | Mulder | |
| 4,806,302 A | 2/1989 | Frank | |
| 4,897,283 A | * 1/1990 | Kumar et al. | 427/448 |
| 5,049,342 A | 9/1991 | Scanlon et al. | |
| 5,073,325 A | 12/1991 | Gray | |
| 5,227,456 A | 7/1993 | Shepherd et al. | |
| 5,517,751 A | 5/1996 | Bross et al. | |
| 5,527,414 A | 6/1996 | Dublinski et al. | |
| 5,688,353 A | 11/1997 | Dublinski et al. | |
| 5,783,259 A | 7/1998 | McDonald | |
| 5,834,064 A | 11/1998 | Dietz et al. | |
| 6,033,724 A | 3/2000 | Molitor | |
| 6,120,854 A | * 9/2000 | Clarke et al. | 427/447 |
| 6,132,668 A | 10/2000 | Baars et al. | |
| 6,143,230 A | 11/2000 | Andrios et al. | |
| 6,159,535 A | 12/2000 | Lutz et al. | |
| 6,174,405 B1 | * 1/2001 | Clarke | 156/289 |
| 6,312,772 B1 | 11/2001 | Kuder et al. | |
| 6,335,095 B1 | 1/2002 | Sugimoto et al. | |

FOREIGN PATENT DOCUMENTS

| | | |
|---|---|---|
| EP | 0 669 207 A1 | 8/1995 |
| EP | 0 669 207 B1 | 8/1995 |
| WO | WO 00/15433 | 3/2000 |
| WO | WO 00/48745 | 8/2000 |

OTHER PUBLICATIONS

"New Blow Molding Resins. A Peek at the Future"; Plastics Technology (4 pages), Dec. 1997.
"Liquid Crystal Polymers: A New Barrier Materials for Packaging", Superex Polymer Inc.; by Richard W. Lusignea; (7 pages), Oct. 1997.
"A New Spin on Liquid Crystal Polymer", *BMDO Update: Issue #32;* (3 pages), 1999/2000.
European Search Report issued for EP 04 25 1624, dated Jul. 20, 2004.

* cited by examiner

*Primary Examiner*—Katherine Bareford
(74) *Attorney, Agent, or Firm*—Fulbright & Jaworski LLP

(57) ABSTRACT

A method of thermoplastic coating composite structures includes heating a tool. A thermoplastic layer is deposited onto the heated tool by thermal spraying a thermoplastic on the heated tool. Composite material is applied onto the thermoplastic layer. The thermoplastic layer and the composite material are then cured.

16 Claims, 2 Drawing Sheets

THERMOPLASTIC COATING FOR COMPOSITE STRUCTURES

TECHNICAL FIELD OF THE INVENTION

This invention relates generally to the field of materials construction and, more specifically, to a method of thermoplastic coating composite structures.

BACKGROUND OF THE INVENTION

Composite structures are desirable in many industries for many applications. The aerospace industry, for example, uses composite structures extensively because, among other desirable attributes, composites have high strength-to-weight ratios. Because of the ever increasing use of composite structures throughout industry, manufacturers are continually searching for better and more economical ways of fabricating composite structures.

Composite structures applied to the exterior of ships and aircraft can experience significant degradation and damage due to their exposure to erosion and environmental attack. In this regard, such structures are constantly subjected to oxidation, moisture, fouling, salt-spray, UV radiation, chemicals, and high and low temperatures, among other things, that can cause such structures to experience significant degradation and damage over time. As a consequence, such structural components are often constantly repaired or replaced to prevent the possibility that a given vessel or aircraft will be damaged permanently, if not destroyed.

To attempt to prevent the damage caused by fatigue and environmental exposure on such composite components, a variety of coating agents and methods of applying the same to such components have been developed to improve their durability. Thermal spraying is one method for applying thermoplastic polymers to a surface. Thermal spraying comprises insertion of feed stock particles, typically of a polymer-like material, into a high-energy heat source that propels the particles, while in a liquid or semi-liquid state, onto the surface of the component sought to be protected. Once propelled onto the surface sought to be protected, the particles fuse together and form a coating on the surface.

High performance thermoplastics offer the potential of a higher wear resistant and lower permeability barrier material as compared to conventional coatings. Thermoplastic coatings on a variety of substrates have been demonstrated using thermal spray techniques. However, when a high melt temperature, high performance thermoplastic such as liquid crystal polymer (LCP) is thermally sprayed on a composite with moderate temperature resistance, out-gassing of moisture and volatiles from the composite substrate can occur which can degrade the structural morphology of the coating. One solution to this problem, described in U.S. Pat. No. 6,174,405 issued to Clarke et al., involves thermally spraying a thermoplastic such as LCP on a metal mold, commonly referred to as a tool. While the coating is still on the tool, a prepreg or wet lay-up of the composite is applied directly on the thermoplastic-coated tool. The composite/coating/tool assembly is then oven/autoclave cured, and, when curing is completed, the thermoplastic-coated composite structure is removed from the tool.

SUMMARY OF THE INVENTION

A method of thermoplastic coating composite structures includes heating a tool. A thermoplastic layer is deposited onto the heated tool by thermal spraying a thermoplastic on the heated tool. Composite material is applied onto the thermoplastic layer. The thermoplastic layer and the composite material are then cured.

A technical advantage of certain embodiments of the present invention is that the heating of the tool may more fully melt and fuse together the thermoplastic particles during deposition, resulting in a coating that may be of a more uniform thickness and morphology and be less porous and/or permeable. In particular embodiments, the occurrence of partially un-melted or heat-damaged thermoplastic may be reduced.

Another technical advantage certain embodiments of the present invention is a reduction in local overheating of the tool caused by the thermal spray gun. This reduction may result in the avoidance of damage or deformation of the tool during thermoplastic deposition. Such reduction may preserve the integrity of any release coating applied to the tool, increasing the ease with which the thermoplastic-coated composite is removed from the tool after the curing step.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

Figure 1:
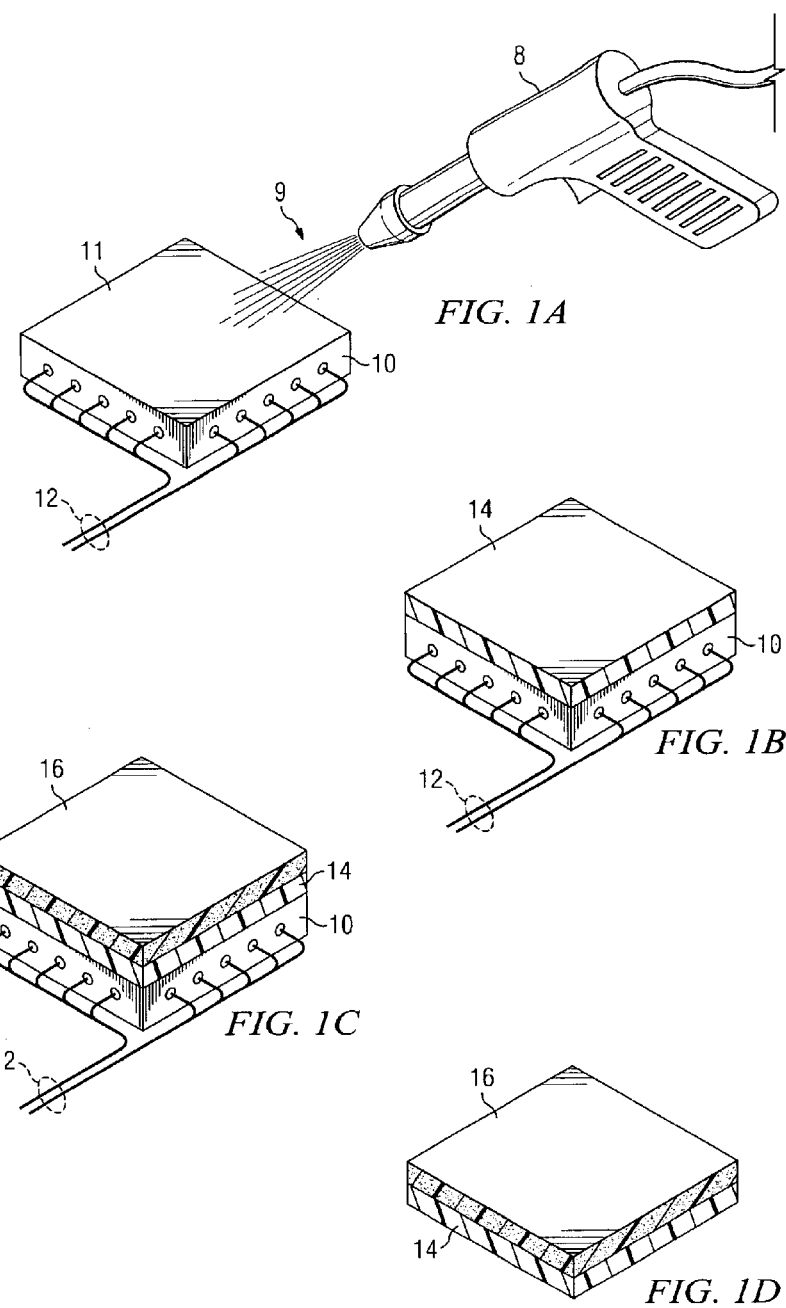
FIGS. 1A, 1B, 1C, and 1D are block diagrams illustrating a method for thermoplastic coating of a composite structure in accordance with one embodiment of the present invention.

FIGS. 1A–1D are block diagrams illustrating a method for thermoplastic coating of a composite structure in accordance with one embodiment of the present invention. FIG. 1A illustrates deposition of a thermoplastic 9 on a working surface 11 of a tool 10 in accordance with one embodiment of the present invention.

Tool 10 reflects the desired shape of the outer surface of the final composite structure and may be formed from a metal material such as aluminum or steel. In a particular embodiment, the tool 10 is coated with Frekote™, Teflon™, or another suitable release coating before deposition of the thermoplastic 9. It will be understood that tool 10 may be formed from other suitable materials, such as ceramic. In the illustrated embodiment, tool 10 is heated before thermoplastic deposition by internal heaters built into the tool 10, powered by electrical or other suitable methods 12 to bring the tool 10 to a temperature sufficient to help in the thermoplastic melt and coating process. It will be understood that tool 10 may be heated by other suitable methods, such as non-internal heaters coupled to or in proximity to tool 10, by covering the tool 10 with heat blankets before depositing the thermoplastic layer, or by passing heated fluids through the tool 10.

A thermoplastic is polymer that reversibly hardens and softens when its temperature is cycled through its melt or glass transition temperature. In a particular embodiment, the thermoplastic layer 9 may have a melting temperature greater than 300° C., and heating the tool 10 results in a temperature difference of less that about 200° C. between the temperature of the heated tool 10 and the temperature of the sprayed thermoplastic. Some high-performance thermoplastics, such as liquid crystal polymers (LCP), described in greater detail below, have a melting temperature of about 288° C. The teachings of the invention recognize a particular advantageous range of tool temperature for LCP deposition of about 177–205° C. However, other temperature ranges of the tool 10 and thermoplastic 9 may be used without departing from the scope of the present invention.

In a particular embodiment, the working surface 11 of the tool 10 is heated to a substantially uniform temperature. In this way, the uniformity of the thermoplastic 9 coverage may be further increased. "Substantially uniform temperature" means a temperature difference of less than about 21° C. between any two points on the working surface. One or more thermocouples and/or infrared pyrometers may be used to monitor the temperature and temperature variations of the working surface 11.

In the illustrated embodiment, the thermoplastic is deposited using a thermal spray gun 8. In a particular embodiment of the present invention, a thermoplastic 9 deposited on tool 10 may comprise a liquid crystal polymer (LCP). LCP is characterized by a high melting point relative to other commonly used thermoplastics, on the order of about 288° C. LCP may comprise co-polyesters, co-polyesteramides, or multiple monomer wholly aromatic polyesters. Among the representative LCP products currently available for use in the practice of the present invention include XYDAR-RT-300, XYDAR-SRT-700, and XYDARSRT-900, produced by Amoco; VECTRA A950, VECTRA L950 and VECTRA E950L, produced by Hoechst Celanese, and Zenite 100, Zenite 600, Zenite 700 and Zenite 800 manufactured by Dupont.

In the illustrated embodiment, deposition of the thermoplastic is by a thermal spray gun 8; however, thermal spray gun 8 may comprise a Teradyne 2000 having a GP type nozzle affixed thereto, of another suitable thermal spray gun such as a combustion spray gun. The thermal spray gun may sustain a stable, non-transferred electric arc between a thoriated tungsten cathode and an annular water-cooled cooper anode. A gas, such as argon or other inert gas, complimented by a small portion of an enthalpy enhancing gas, such as hydrogen, may be introduced at the back of the gun's interior such that gas swirls in a vortex and out of the front end of the anode nozzle. The electric arc from the cathode to the anode completes the circuit, thus forming a flame that axially rotates due to the vortex momentum of the gas. The temperature of the flame just outside the nozzle exit is high enough to melt the thermoplastic. The flame temperature drops off rapidly from the exit of the anode and, therefore, causes the thermoplastic, which is typically in powder or other solid particle form, to be introduced at the hottest part of the flame generated by the thermal spray. Thermal spraying may be done with a hand-held sprayer or by an automated (e.g., robotic) process.

FIG. 1B illustrates a thermoplastic layer 14 deposited as described above on tool 10. By heating working surface 11 of tool 10, the temperature differential between the tool and the thermally-sprayed thermoplastic is reduced and the thermoplastic particles may more fully melt and fuse together during thermal spraying, resulting in a coating that may be of a more uniform thickness and morphology and be less porous and/or permeable than with prior methods. In particular embodiments, the occurrence of partially un-melted or heat-damaged thermoplastic may be reduced.

In addition, local overheating of the tool from the thermal spray gun may be reduced, resulting in the avoidance of damage or deformation of the tool during thermoplastic deposition. Such reduction may preserve the integrity of any release coating applied to the tool, increasing the case with which the thermoplastic-coated composite is removed from the tool after the curing step (described below).

In a particular embodiment, layer 14 may have a thickness of about 0.005 inches. However, the thickness of the layer 14 may suitably vary in accordance with various embodiments of the present invention.

As illustrated in FIG. 1C, a layer 16 of composite material is applied as a prepreg, wet lay-up, or other suitable method onto the thermoplastic layer 14. The composite material may comprise fiber reinforced polymers or other suitable materials. The composite/coating/tool assembly is then oven/autoclave cured using conventional process conditions. When curing is completed, the thermoplastic-coated composite structure may be removed from the tool 10.

As illustrated in FIG. 1D, the layer 16 of composite material and thermoplastic layer 14 are removed from the tool 10. Thermoplastic layer 14 may then form a protective outer surface of the composite layer 16, and the composite layer 16 together with thermoplastic layer 14 may then be suitably affixed to the outer surface of a vessel or aircraft or other vise suitably employed. In particular embodiments, an adhesive (not explicitly shown) may be applied onto the thermoplastic layer 14 before applying the layer 16 of composite material. The adhesive may increase a bond between the thermoplastic layer 14 and the composite material, thereby, in particular embodiments, increasing the strength of the structure comprising layers 14 and 16 and further increasing the ease with which the thermoplastic-covered and cured composite material may be removed from the tool 10.

Figure 2:
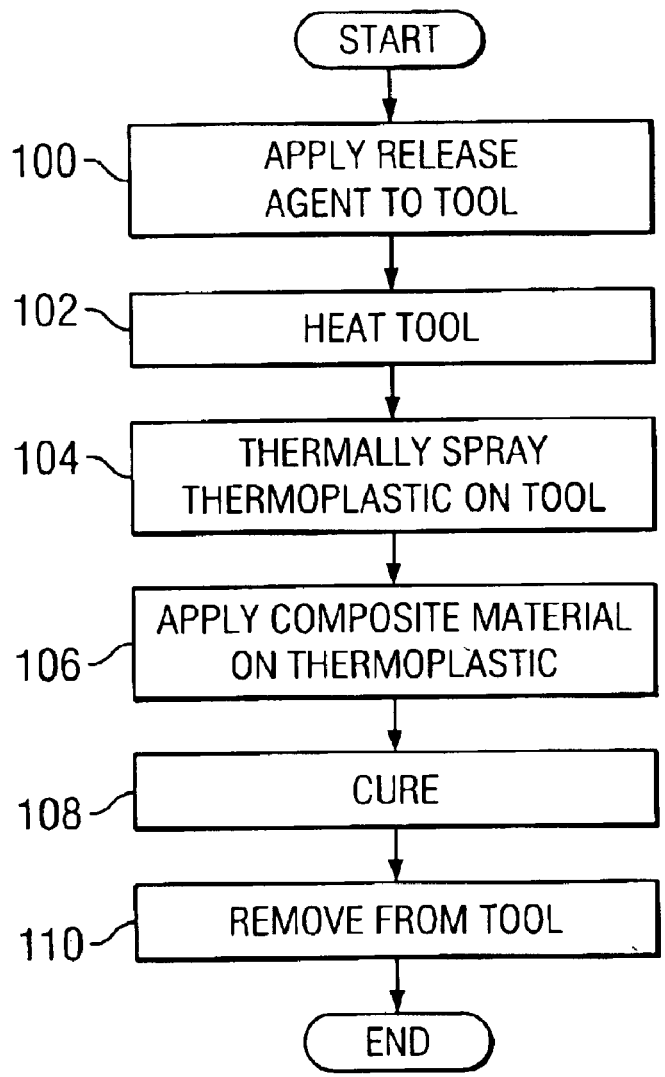
FIG. 2 is a flowchart illustrating a method for thermoplastic coating of a composite structure in accordance with one embodiment of the present invention.

FIG. 2 is a flowchart illustrating a method for thermoplastic coating of a composite structure in accordance with one embodiment of the present invention. Beginning with step 100, a release agent such as Teflon™ is applied to the working surface 11 of tool 10. At step 102, the tool 10 is heated. In a particular embodiment wherein the thermoplastic to be deposited onto the tool 10 comprises LCP, tool 10 may be heated to a temperature of approximately 190° C.

Proceeding to step 104, LCP or other suitable thermoplastic is thermally sprayed to deposit a thermoplastic layer 14 onto the heated tool 10. In some embodiments, the melting temperature of the thermoplastic may be around 288° C. The difference between the temperature of the heated tool 10 and the sprayed thermoplastic can be less than about 100° C. At step 106, at layer 16 of composite material is applied onto the thermoplastic layer 14. Thermoplastic layer 14 and composite material layer 16 are then cured at step 108. Finally, at step 110, thermoplastic layer 14 and composite material layer 16 are removed from the tool 10, resulting in a thermoplastic-coated composite.

Although an embodiment of the invention and its advantages are described in detail, a person skilled in the art could make various alterations, additions, and omissions without departing from the spirit and scope of the present invention as defined by the appended claims.

What is claimed is:

1. A method of thermoplastic coating composite structures, comprising:

heating a tool, wherein heating the tool comprises heating the tool to a first temperature;

heating a thermoplastic to a second temperature for thermal spraying the thermoplastic, the second temperature greater than the first temperature by less than about 100° C.;

depositing a thermoplastic layer onto the heated tool by thermal spraying the thermoplastic on the heated tool;

applying a layer of composite material onto the thermoplastic layer; and curing the thermoplastic layer and the layer of composite material.

2. The method of claim 1, further comprising removing the thermoplastic layer and the layer of composite material from the tool.

3. The method of claim 1, wherein the thermoplastic comprises a liquid crystal polymer.

4. The method of claim 1, further comprising applying a release agent on the tool before thermal spraying the thermoplastic.

5. The method of claim 1, further comprising applying an adhesive onto the thermoplastic layer before applying the layer of composite material.

6. The method of claim 1, wherein heating the tool comprises applying a heating blanket over the tool.

7. The method of claim 1, wherein heating the tool comprises coupling a heating element to the tool.

8. The method of claim 1, wherein tool comprises an internal heating element, and the heating comprises forwarding power to the internal heating element.

9. The method of claim 1, wherein thermal spraying a thermoplastic comprises thermal spraying a thermoplastic having a melting temperature of about 288° C.

10. The method of claim 1, wherein heating the tool comprises heating the tool to a temperature between about 177° C. and about 205° C., and wherein the thermoplastic comprises a liquid crystal polymer.

11. The method of claim 1, wherein heating the tool comprises heating the tool to a temperature of about 190° C., and wherein the thermoplastic comprises a liquid crystal polymer.

12. The method of claim 1, wherein heating the tool comprises heating a working surface of the tool to a substantially uniform temperature.

13. A method of thermoplastic coating composite structures, comprising:

heating a tool to a first temperature between about 177° C. and about 205° C.;

depositing the thermoplastic onto the heated tool to form a thermoplastic layer, wherein the thermoplastic comprises a liquid crystal polymer, and wherein the depositing the thermoplastic comprises thermal spraying;

applying a layer of composite material onto the thermoplastic layer; and curing the thermoplastic layer and the layer of composite material.

14. The method of claim 13, wherein heating the tool comprises heating a working surface of the tool to a substantially uniform temperature.

15. The method of claim 13, wherein heating the tool to the first temperature between about 177° C. and about 205° C. comprises heating the tool to a temperature of about 190° C.

16. A method of thermoplastic coating composite structures, comprising: applying a release agent on a tool;

heating the tool to a temperature greater than about 177° C., wherein heating the tool to the temperature greater than about 177° C. comprises heating the tool to a temperature of about 190° C.;

thermal spraying a thermoplastic to deposit a thermoplastic layer onto the heated tool, the thermoplastic comprising a liquid crystal polymer;

applying a composite material onto the thermoplastic layer;

curing the thermoplastic layer and the composite material; and removing the thermoplastic layer and the composite material from the tool.

* * * * *

UNITED STATES PATENT AND TRADEMARK OFFICE
CERTIFICATE OF CORRECTION

PATENT NO. : 6,974,606 B2  Page 1 of 1
DATED : December 13, 2005
INVENTOR(S) : Don Di Marzio et al.

It is certified that error appears in the above-identified patent and that said Letters Patent is hereby corrected as shown below:

Column 1,
Line 4, prior to Technical Field of the Invention, insert the following heading and paragraph:
-- STATEMENT REGARDING FEDERALLY SPONSORED RESEARCH OR DEVELOPMENT
This invention was made with government support under Contract Number N00014-98-3-0014 awarded by the Office of Naval Research. The government has certain rights in the invention --.

Signed and Sealed this

Twenty-eighth Day of March, 2006

JON W. DUDAS
*Director of the United States Patent and Trademark Office*